Nov. 20, 1962  A. E. BISHOP  3,064,491
VARIABLE RATIO STEERING GEAR
Filed Dec. 11, 1961
3 Sheets-Sheet 1
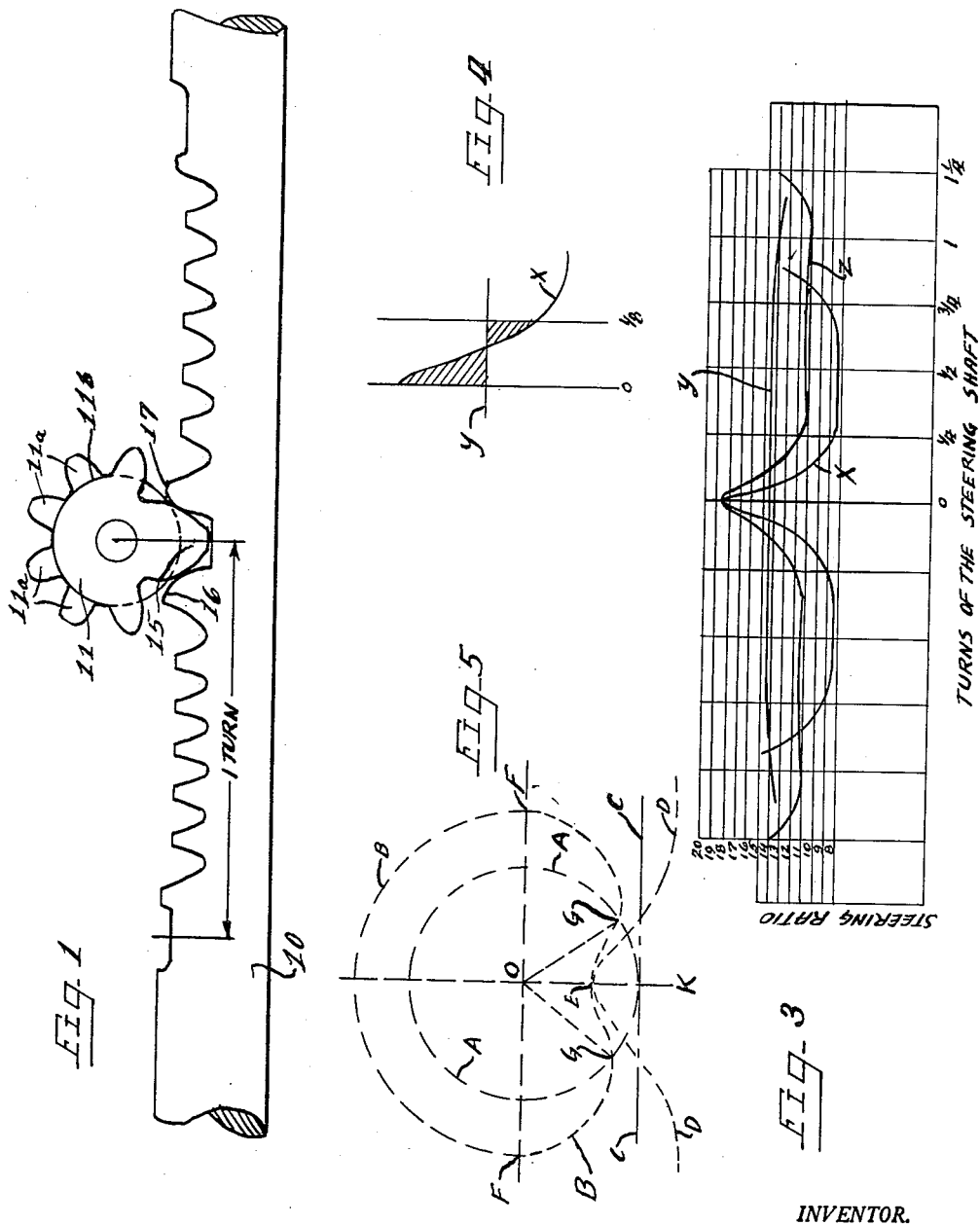
INVENTOR.
Arthur E. Bishop
BY
ATTORNEYS Nov. 20, 1962    A. E. BISHOP    3,064,491
VARIABLE RATIO STEERING GEAR
Filed Dec. 11, 1961    3 Sheets-Sheet 2
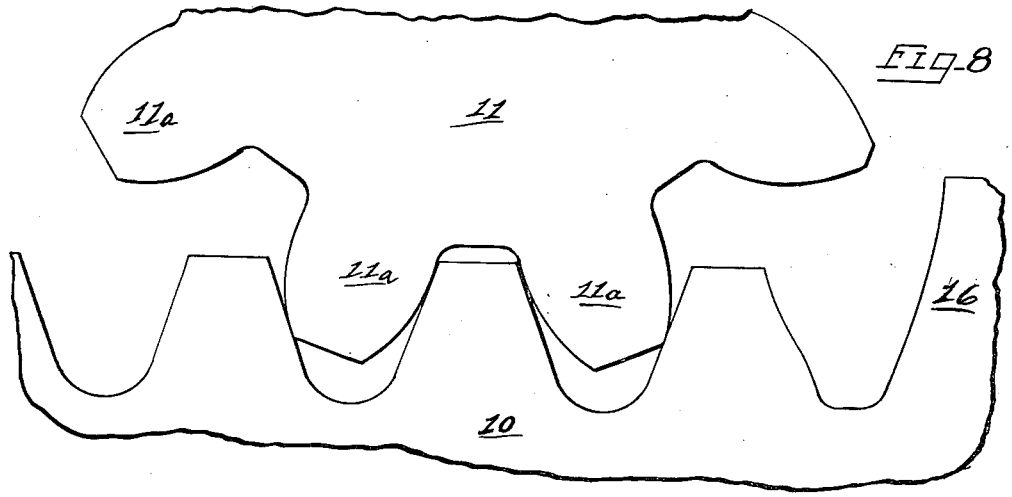
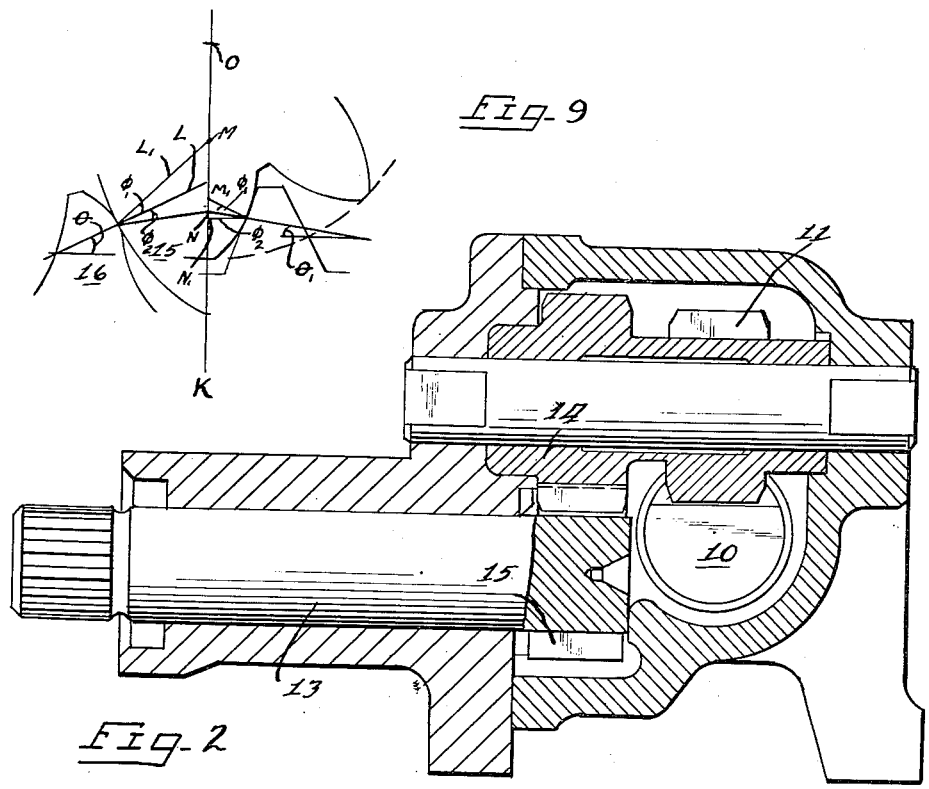
INVENTOR.
Arthur E. Bishop
BY
ATTORNEYS Nov. 20, 1962    A. E. BISHOP    3,064,491
VARIABLE RATIO STEERING GEAR
Filed Dec. 11, 1961    3 Sheets-Sheet 3
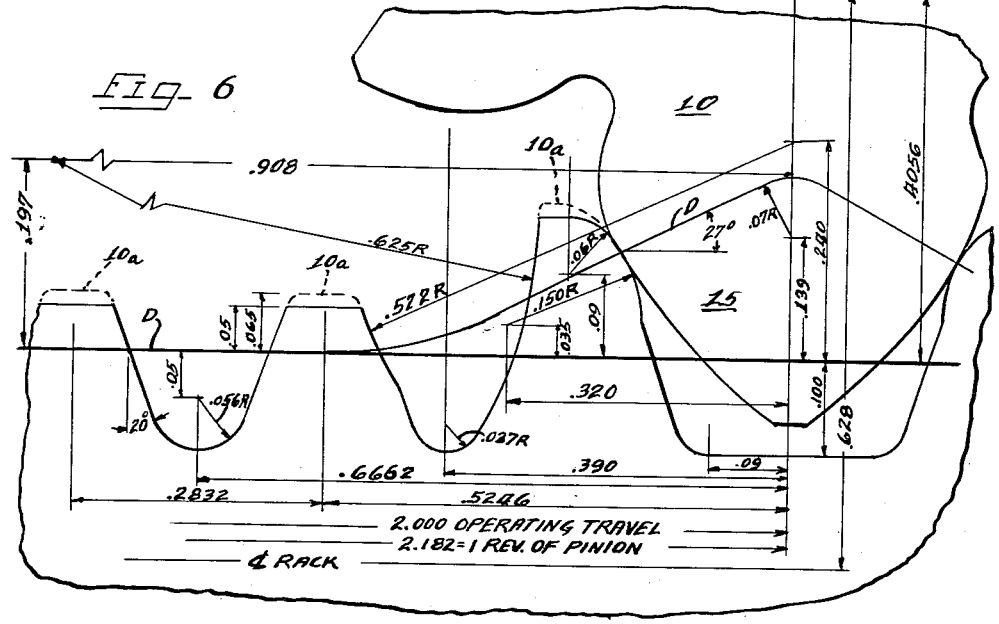
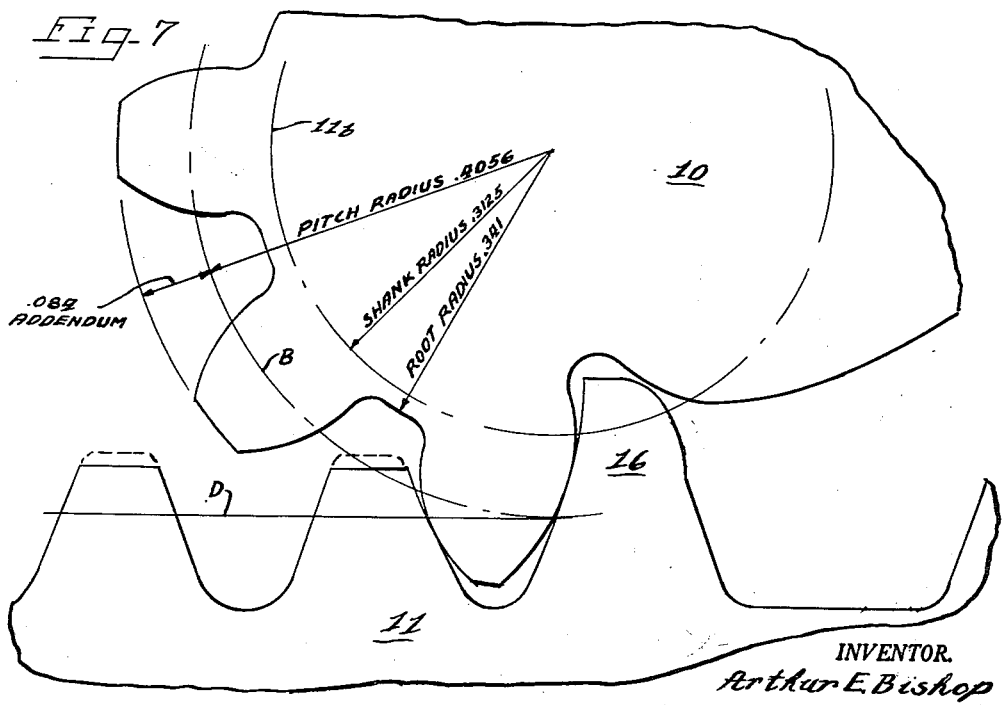
INVENTOR.
Arthur E. Bishop
BY
ATTORNEYS United States Patent Office 3,064,491
Patented Nov. 20, 1962

3,064,491
VARIABLE RATIO STEERING GEAR
Arthur E. Bishop, 5516 Westwood Lane,
Birmingham, Mich.
Filed Dec. 11, 1961, Ser. No. 158,349
Claims priority, application Great Britain Aug. 30, 1961
6 Claims. (Cl. 74—437)

The present invention relates to variable ratio mechanism particularly suited to automotive vehicle steering. As will be apparent from a consideration of the attached specification and drawings, the variable ratio mechanism of the present invention may be employed as a part of a manually powered steering system but due to the relatively low steering ratios employed with the preferred embodiments of the invention it may most advantageously be employed in vehicle steering systems using power assists.

Much development work has been undertaken in the past in the field of rack and pinion steering gear drives. However, the limitations of rack and pinion type gearing, when employed in automotive vehicle steering, have very seriously restricted its commercial use. Although many systems have been proposed, the use of rack and pinion gearing has been limited, to date, to relatively small vehicles or racing automobiles. Limitations of the rack and pinion construction include the great difficulty of obtaining adequate strength (diameter) in the pinion for a given steering ratio; the existence of excessive "kickback" or the transmission of road shock back of the steering wheel resulting from the fact that the reverse efficiency of rack and pinion gearing of conventional type is almost as high as the forward or steering efficiency. While these limitations have been present, and comprise very important limitations, several important advantages are available from rack and pinion design. Included in such advantages are very low total cost of construction of the gear assembly, extremely high gearing efficiency and very great steering gear rigidity which provides improved response, particularly when variable ratio providing a very high ratio at the center condition, is employed.

In accordance with the present invention a variable ratio rack and pinion steering gear is provided in which the limitation above mentioned are greatly alleviated and the improvements or advantages are retained and, particularly, the last-named advantage of rigidity, are enhanced.

In accordance with the present invention the steering shaft is drivingly connected to a mutilated pinion which in turn co-operates with a variably contoured rack which is, in turn, directly connected to the steering linkage of the vehicle. In the geometry of the vehicle the rack is positioned for movement transverse of the longitudinal center line of the vehicle and hence may be directly connected to the transversely moving tie rod of the vehicle steering linkage or, alternatively, may be formed to provide such tie rod directly in such instances where the steering gear may be placed conveniently relative to the steering geometry. The broad concept of a mutilated, or non-round, gear configuration for employment in a rack and pinion steering gear has been described at some length in my previous patents, particularly, United States Letters Patent No. 2,973,658 dated March 7, 1961. The construction of the present invention comprises a refinement of the broad concept, however, and provides important advantages in substantially increased rate of ratio change adjacent the in-line condition while at the same time maintaining a high strength of the pinion. This is accomplished through construction of the pinion member with a single large center tooth which acts as the force transferring agent for the pinion-to-rack force transfer during the major portion of the ratio change. This single large tooth operates, in effect, essentially as a cam tooth and through employment of this cam tooth in co-operation with corresponding cam teeth on the co-operating rack, the effective pitch line of the rack and pinion combination is enabled to move abruptly toward the axis of the pinion, completely outside the confines of the rack tooth configuration, to provide a very high steering ratio in the in-line condition with an abruptly decreasing steering ratio immediately adjacent the in-line position. This cam tooth configuration permits, in addition, the incorporation of the substantially greater irreversibility of force transmission, or, in other words, a substantial reduction in the efficiency of force transfer from the racks back to the pinion as compared with the force transfer from the pinion to the rack, thereby substantially improving the operation of the rack and pinion gearing for automotive steering use.

It is, accordingly, an object of the present invention to provide an improved variable ratio rack and pinion steering gear for automotive vehicles or the like.

Another object of the invention is to provide a novel rack and pinion steering gear employing a cam tooth as a part of the pinion and co-operating cam teeth as a part of the rack co-operating with the pinion to thereby provide a stronger pinion construction.

Another object of the present invention is to provide a variable ratio rack and pinion gearing configuration in which the effective pitch line of the combination actually moves outside the physical confines of the rack teeth thereby providing a very high ratio change.

A feature of the invention is the provision of a mutilated rack and pinion steering gear wherein a single large central cam tooth is provided on the pinion for co-operation with the rack in a manner such that the radius of the effective pitch circle of the pinion is at its minimum at the center of the large tooth.

Yet a further feature of the invention is the construction of a variable ratio mutilated rack and pinion power steering gear in which the pinion comprises a plurality of teeth including a single large cam tooth arranged so that the radius of the effective pitch circle of the pinion is at a minimum at the central point of said tooth and is, at that point, outside the physical confines of the co-operating rack.

Yet another feature of the invention resides in the provision of a mutilated gear rack and pinion steering system which substantially reduces "kick-back" or road reaction during operation of the vehicle in the straight-ahead condition.

Yet another object of the invention is the provision of a variable ratio power steering system having an extremely rapid drop in ratio immediately adjacent the in-line steering condition and reaches a condition of minimum ratio within approximately one-quarter turn of the steering shaft.

Yet a further feature of the invention resides in the construction of a pinion for a rack and pinion reduction gear wherein a minimal number of teeth are employed without unduly overloading such teeth.

Still other and further objects and features of the invention will at once become apparent to those skilled in the art from a consideration of the attached drawing wherein:

FIGURE 1 is an end elevational view of the steering shaft in co-operation with a rack in conformity with the present invention;

FIGURE 2 is a side elevational view of a rack and pinion construction similar to that shown in FIGURE 1 but having additional reduction gearing associated therewith;

FIGURE 3 is a graph illustrating the ratio characteristics of the variable ratio rack and pinion gears constructed in accordance with the present invention;

FIGURE 4 is a further graph illustrating operation of the present invention;

FIGURE 5 is a diagrammatic view illustration of the variable ratio gear pitch line configuration compared with the pitch line configuration of standard, non-variable ratio gearing;

FIGURE 6 is a fragmentary view of a variable ratio rack and pinion constructed in accordance with the present invention, and illustrated in the centered, straight-ahead, condition;

FIGURE 7 is a fragmentary view of the rack and pinion illustrated in FIGURE 6 and moved approximately 60° away from centered position;

FIGURE 8 is a third fragmental view of the gearing illustrated in FIGURE 6 in which the components have been rotated approximately 140° away from centered condition; and FIGURE 9 is a diagrammatic illustration of the force transfer action of the gear of the present invention compared with a conventional rack and pinion gear.

As shown on the drawings:

As has been pointed out above, the rack and pinion variable ratio gear of the present invention comprises an improvement over my prior United States Letters Patent Number 2,973,658. It is intended that the variable ratio apparatus constructed in accordance with the present application will be connected to the steering linkage of the vehicle in the same manner illustrated in said Patent No. 2,973,658 and, similarly, the control valving employed, where the apparatus of the present invention is employed with power boost, may similarly preferably be the same as that illustrated in my related earlier Patent No. 2,865,339 issued December 23, 1958.

Thus, as will be apparent to those skilled in the art from a consideration of the drawings, the variable ratio rack and pinion of the present invention comprises a reciprocal rack 10 here shown as of generally cylindrical cross-section, which co-operates with a cam, or non-round, pinion 11, driven by the steering shaft. The rack 10 may be directly connected to the steering linkage of a vehicle with or without the incorporation of a power booster as illustrated in my above-mentioned Patent No. 2,973,658. The cam gear 11 is preferably similarly directly connected to the steering shaft but may, in the form of the invention shown in FIGURE 2, be connected to a steering shaft 13 by way of reduction gearing comprising gears 14 and 15 rigidly secured to or integral with the respective gear 11 and steering shaft 13. By employing the gear reduction specified, somewhat more than one full turn of the steering gear is permitted away from the centered, in-line, condition in each direction of turn. The use of rack and pinion gearing with more conservative vehicles is thus permitted. Due to the cam configuration of the present gearing, more fully set forth below, a very rapid rate of ratio drop that maintains the high initial rate of ratio reduction without adversely weakening the pinion gear is provided, even when the reduction gearing is employed.

Where utilization of steering employing slightly less than two turns of the steering wheel from lock-to-lock is permitted, such as for example in relatively agile sport car designs and the like, the extremely rapid drop in ratio permitted by the direct, non-reduction, form of gearing provides important advantages. In such relatively lightweight automobiles, great emphasis is placed on nimbleness and the ability of the vehicle to make rapid lateral shifts or steering maneuvers. This ability is sometimes referred to as the "dodge rate" of the vehicle and comprises the side shift or lateral turning of a vehicle resulting from a quick maneuver of the steering wheel on the order of magnitude which would occur as a reflex movement. Ordinarily, a reflex steering motion of approximately one-eighth turn of the steering shaft may reasonably be encountered and, accordingly, the amount of lateral shift or steering that is accomplished within the first one-eighth turn of the steering wheel comprises an important consideration in steering design of such vehicles.

As those familiar with the design and utilization of variable ratio steering of the type set forth in the above-mentioned earlier patents such as Patent No. 2,973,658 are aware, it is desired that the centered or straight-ahead condition of the vehicle be provided with a substantially greater steering ratio than is presently employed in some European vehicles. The European vehicles have traditionally been provided with substantially lower steering ratios than the automotive vehicles commonly employed in the United States and have been substantially more nimble for that reason. However, at the same time, the relatively low ratios employed in such vehicles have rendered them tiring to drive on the open road due to the fact that continual adjustment of the relatively direct steering is required. In accordance with the improved construction of the present invention, the nimbleness or "dodge rate" of the vehicle over the first one-eighth turn of the steering shaft is retained on the same order of magnitude as the presently existing constant ratio vehicles while at the same time a substantially higher ratio is provided in the straight-ahead condition. Accordingly, the advantages of variable ratio are achieved without decreasing the over-all response and efficiency of the steering system in a manner objectionable to the driving public of Europe which is accustomed to a far higher degree of nimbleness and "dodge rate" than employed in the United States.

As will be apparent to those skilled in the art of vehicle steering gear construction, the construction of a rack and pinion gear system capable of providing a relatively high ratio at the midpoint with a rapidly decreasing ratio adjacent such midpoint will require a very small effective diameter of the pinion if the over-all size of the steering gear is to be maintained within reasonable limits. Considering this problem without specific reference to dimensions, it may be seen from FIGURE 5 of the drawings that a difficult problem exists. As there shown, the pitch circles of a standard constant ratio rack and pinion unit are shown. The pitch circle of the standard gear is indicated at A while the pitch circle of the rack, a circle of infinite radius, is illustrated at C. On the other hand, a variable ratio rack and pinion are represented in FIGURE 5 by pitch circles B and D which designate the respective pinion and rack circles. It will be observed that the ratio provided by the pitch circles B and D varies from a minimum at the straight-ahead or midpoint E to a maximum after approximately 90° of steering shaft rotation, or attainment of the position F. In achieving this change in ratio, the pitch line passes through the pitch line of the standard rack and pinion gear at points G where the pitch circles A and B are coincident.

If conventional gear tooth forms generally following the contours of the pitch lines were employed to provide the extremely varying pitch circles illustrated at B and D, for example from approximately 19 to 1 in the midpoint position to approximately 9 to 1 in the extreme position, extremely little tooth support volume would be provided in the pinion at the point E where the pitch circle radius is a minimum. In accordance with the present invention, therefore, gear teeth generally following the contours of the desired pitch circle configuration are not employed in the area of maximum ratio change. Instead, a single large cam tooth is provided as indicated at 15 of the drawings co-operating with a pair of straddling teeth 16 and 17 on the rack 10 to provide substantially all of the change of ratio. The remaining teeth on the pinion and rack, comprising approximately half of the rotation of the pinion following the initial approximately 90° of rotation of the pinion away from center in which variable ratio occurs, are substantially constant ratio handled by generally standard gear tooth configuration. In this novel construction, a relatively simple and extremely compact rack is provided which has rack teeth projecting toward the steering pinion a distance actually less than the position of the rack pitch line at the point of maximum ratio. This relationship is illustrated in FIGURE 6 of the drawing where the pitch line of the rack is indicated at D and projects well above the uppermost edge of the rack teeth 16 and 17.

It will be seen that the central tooth 15 may readily be made to control the entire range of movement of the pinion from the in-line position indicated at OE in FIGURE 5 to the position of coincidence between the normal constant ratio pinion and the variable ratio pinion indicated at OG. The exact dimensions of the tooth configurations which provide an extremely varying pitch line which projects toward the axis of rotation of the pinion beyond the nearest projections of the rack teeth may of course be varied with different installations. However, a satisfactory compact steering gear constructed in accordance with the pesent invention may have the following dimensions in an apparatus providing two inches of operating travel of the rack on each side of center with a corresponding theoretical design movement of the rack of 2.132 inch each side of center for one revolution of the pinion. The pinion outside diameter equals .980 inch with a pitch radius of .4056 inch and a .084 inch pinion tooth addendum for the four conventionally shaped teeth 11a. The pinion shank diameter 11b equals .625 inch and it will be observed that while the cam gear of the present invention is nonround since the pitch line, or effective radius thereof, is of variable radius, the outside periphery of the pinion may, if desired, comprise a circle concentric with the shank, as shown. The pitch line of the rack is shown in detail in FIGURE 6 of the drawings where the dimensions for the rack teeth 16 and 17 at the central portion of the rack are set forth. In the manufacture of the gearing in accordance with the dimension set forth in FIGURE 6, and above specified, the specific curvature of the tooth 15 of the pinion, as well as the remaining teeth thereof, need not be specifically stated since the pinion may, upon completion of the rack, be generated therefrom in the conventional manner in which a shaping cutting tool having a profile in the form of the rack teeth and reciprocating along an axis parallel to the axis of the pinion is first advanced towards the axis of the pinion until tooth depth is reached and is then moved laterally of its axis of reciprocation as the pinion blank is rotated. To produce the desired variable ratio relationship the lateral movement of the shaping tool and the rotation of the pinion is varied by a cam or other conventional means to correspond with the pitch line illustrated. In this operation, root clearance may be assured in the conventional gear generation technique by providing slight tooth extensions on the cutter periphery, for example, as shown at the dotted lines 10a in FIGURES 6, 7 and 8.

As those familiar with the problems of manufacture and sale of steering gear are aware, one of the most serious practical limitations on the construction of steering gear is size. The space available for steering gear components has progressively decreased in the design of modern vehicles and, accordingly improved steering designs have occasionally been rejected on the basis that improved output characteristics of them were more than offset by increased over-all size required to incorporate the improvements. The construction of the present invention is, however, as above observed extremely small and compact and is not, accordingly, subject to such criticism. In fact, the variable ratio rack and pinion configuration illustrated provides an unusually sturdy device. In constructing gear pinions of small diameter and small number of teeth, the root diameter of the pinion teeth is ordinarily the effective diameter of the pinion shank. In ordinary practice in the construction of standard gearing, it is, therefore, usual that the pinion pitch circle be placed as close as possible to the root of the pinion gear teeth. When FIGURE 5 of the drawings is considered, the pitch circle A would, accordingly, in standard practice be of only slightly greater radius than the root circle of the standard pinion. With such an arrangement, clearly, the substantially lesser pitch line radius OE employed in accordance with the present invention would, if conventional tooth forms were employed, require an effective shank diameter substantially less than that employable with the standard pinion. However, utilization of the single large cam tooth employed in accordance with the present invention the root radius dips within the shank diameter at two places only, namely at the root portions immediately adjacent the single large tooth. This permits retention of a relatively large shank diameter that would not be feasible were conventional tooth forms employed, following the contours of the pitch line B. In the circumstances, it has been found that even though a very small number of teeth are employed in the variable ratio gear of the present invention, and the effective pitch line very nearly approaches the center of the pinion to provide a very substantial increase in steering ratio adjacent the in-line condition, nevertheless the pinion of the present invention may be retained at a relatively large size compatible with the needs of the automotive industry.

As noted earlier, one of the deficiencies of conventional rack and pinion gearing as applied to automotive steering, is its substantially complete reversibility. In other words, the transfer of force from the vehicle wheels back to the steering shaft is almost as efficient as the transfer of force from the steering wheel to the vehicle wheel. As a result, kick-back, or road impact forces, are directly related back to the steering shaft practically unabated. In accordance with the present invention, the single large cam tooth provides, in the straight-ahead or on-center condition, a relatively selective force transfer. This is illustrated in FIGURE 9 of the drawings where the illustration on the left side of the lines OK shows the teeth 15 and 16 of the present invention while the illustration on the right hand side of the line OK shows conventional rack and pinion gearing. The large cam tooth of the present invention provides, since the flank of the gear tooth must always intercept the pitch line at an angle greater than 90°, a pressure angle $\theta$ which will be greater than approximately 30° in the embodiment of the invention illustrated with the ratio change on the order of 2 to 1 is provided. In conventional gearing the pressure angle is ordinarily retained at substantially lesser figure, such as indicated at $\theta_1$ in FIGURE 9. When angle equal to the coefficient of friction is added to each side of the line normal to the point of contact, the discrimination between forward and reverse drive conditions is shown. Thus, in the case of the gearing of the present invention, employing a relatively great pressure angle and a point of contact removed away from the line OK a substantial distance, the line of action $L_1$ resulting from the addition of the angle $\phi_1$ comprising an angle equal to the coefficient of friction, added to the theoretical normal or line of action L, provides an intercept OM when the rack drives the pinion and the corresponding intercept ON when the pinion drives the rack. Since the force transfer in any instant will be governed by the length of the intercept OM or ON, the force transfer in the forward direction, from the pinion to the rack, is substantially greater than in the reverse. On the other hand, in the conventional gearing employing an initial pressure angle somewhat smaller than the pressure angle $\theta$ and substantially closer to the line OK, the difference between the intercept $OM_1$ and $ON_1$ is comparatively negligible. Thus, it will be seen that the variable ratio rack and pinion construction employing a single large cam tooth hereinabove described, provides a very substantial discriminatory action in and adjacent to the in-line condition. This discriminatory action is, of course, lost when the force contact passes to those points on the pinion tooth surface which lie inside the pinion pitch line B, and is no greater than the discriminatory action provided in conventional gearing at conditions when the pinion teeth $11a$ are in contact with the rack. However, these latter conditions take place during operation of the steering gear at points substantially away from the in-line condition and, as those skilled in the vehicle art are aware, kick-back is a problem mainly in straight-ahead, highway, driving conditions. Accordingly, the kick-back suppression or discrimination provided by the structure of the present invention is an important advantage over standard rack and pinion, non-variable ratio, steering gear.

The nimbleness of the variable ratio gear constructed in accordance with the present invention is illustrated in FIGURES 3 and 4. It will be observed from FIGURE 3 that a conventional standard, substantially constant ratio, steering gear commonly employed in the European market, may have a ratio curve Y of approximately 14 to 1 throughout its range of operation. At one-eighth turn of the steering wheel it will be seen that the ratio curve X corresponding to the characteristics of the structure of the present invention, and the embodiment thereof described in detail above, will have dropped from an initial ratio of approximately 19 to 1 to a ratio of almost 9 to 1. On an average, accordingly, it will be observed that the shaded areas, illustrated in FIGURE 4, comprising the difference above and below the line Y, will be approximately equal and hence, accordingly, the average movement of the steering gear at the wheels will be approximately the same with the variable ratio gear of the present invention as with the constant ratio conventional gear.

As illustrated in FIGURE 2 of the drawings, the rack and pinion system of the present invention may employ reduction gears 14 and 15 if desired. Utilization of such reduction gearing will permit construction of a steering gear providing more than one turn of the steering wheel from the in-line condition to the extreme position of turn. A curve employing this construction is illustrated at line Z of FIGURE 3. It will be observed from FIGURE 3 that introduction of a first stage reduction prior to the variable ratio stage will stretch the ratio curve sidewise somewhat so that the rate of change of the ratio curve will be decreased.

It will be observed, from the above, that I have provided a variable ratio steering gear providing a remarkably high rate of ratio drop adjacent the in-line steering condition while at the same time retaining the rack and pinion part of small size and, nevertheless, satisfactory strength. By providing a single large cam tooth on the pinion, the pitch line of the pinion may project substantially inwardly of the root diameter of the pinion without requiring actual physical clearance, and hence elimination of metal, in the pinion. This has provided a strong pinion and has, further provided a pinion which is discriminatory in its force transfer in the forward and reverse directions. I have found that by providing a rack and pinion construction in which the pitch line of the rack projects toward the axis of rotation of the pinion beyond the maximum projection of the teeth of the rack, a situation impossible with prior art constructions, the very high rate of ratio change desired for satisfactory nimbleness is achieved. Achievement of this pitch line configuration is permitted through employment of the large cam tooth in the manner illustrated. It will, accordingly, be seen that I have provided a substantially improved variable ratio steering gear system. It will be apparent, further, to those skilled in the art that variations and modifications may be made in the construction illustrated without departing from the scope of the novel concepts of the present invention. It is, accordingly, my intention that the scope of the present invention be limited solely by that of the hereinafter appended claims.

I claim as my invention:

1. In combination, a variable ratio steering gear for connecting a steering shaft member to a steering output member for steering association with dirigible vehicle wheels comprising a cam gear on said shaft member and a rack on said output member, said cam gear comprising a nonround symmetrical gear mounted on said shaft member for rotation therewith and having a pitch circle of sharply reduced radius at one point on the periphery thereof, said cam gear comprising a plurality of teeth having a substantially constant pitch circle on the periphery thereof opposite from said point of reduced pitch circle radius and a large cam tooth of greater tooth length and width than said first named teeth at said point of reduced radius, said rack being symmetrical on opposite sides of a midpoint and having a pitch line which mates with the pitch circle of said cam gear and which projects beyond the extent of the teeth on said rack toward said cam gear at the center of said rack.

2. A variable ratio rack and pinion gear for vehicle steering comprising a cam pinion having a plurality of teeth of generally constant pitch circle and a cam tooth thereon having an effective pitch circle portion of substantially less radius than the remainder of the teeth on said pinion and a rack member having a variable pitch line mating with the pitch circle of said cam pinion and having a portion thereof projecting toward said pinion a distance greater than the maximum projection of the teeth of said rack whereby a sharp ratio change is provided at the midpoint position of said rack and pinion.

3. In combiniation in a variable ratio rack and pinion gear for automotive vehicles or the like, a cam pinion having a plurality of teeth thereon having a generally constant pitch circle and a cam tooth thereon having a pitch line of substantially reduced radius, said cam tooth having transitional small cam teeth on opposite sides thereof providing a pitch line of gradually increasing radius between said cam tooth and said plurality of gear teeth whereby the change in radius of the pitch line of said pinion occurs smoothly, and a co-operating rack having a variable pitch line projecting toward said pinion beyond the teeth on said rack adjacent the midpoint thereof.

4. A variable ratio rack and pinion drive wherein a pinion rotates to drive a rack, comprising a cam pinion having a plurality of teeth of a first relatively large pitch diameter and a large cam tooth on said pinion at a point generally opposite said plurality of teeth and having a pitch circle portion of substantially reduced diameter and said rack having a central portion for co-operation with said cam tooth and extremity portions for co-operation with said plurality of teeth.

5. A variable ratio rack and pinion drive wherein a pinion rotates to drive a rack, comprising a cam pinion having a plurality of teeth of a first relatively large pitch diameter and a large cam tooth on said pinion at a point generally opposite said plurality of teeth and having a pitch circle portion of substantially reduced diameter and said rack having a central portion for co-operation with said cam tooth and extremity portions for co-operation with said plurality of teeth, said cam tooth contacting cam teeth on said rack at a pressure angle greater than 30° at a distance remote from a line passing through the axis of rotation of said pinion perpendicular to said rack whereby the efficiency of force transfer from said pinion to said rack is substantially greater than the transfer from said rack to said pinion.

6. A variable ratio rack and pinion drive wherein a pinion rotates to drive a rack, comprising a cam pinion having a plurality of teeth of a first relatively large pitch radius and a large cam tooth on said pinion at a point generally opposite said plurality of teeth and having a pitch circle portion of substantially reduced radius and said rack having a central portion for co-operation with said cam tooth and extremity portions for co-operation with said plurality of teeth, the change in radius of said pitch line from its maximum value to a minimum value of less than one-half said maximum value occurring within one-quarter turn of said pinion.

References Cited in the file of this patent

UNITED STATES PATENTS

| | | |
|---|---|---|
| 466,923 | Price | Jan. 12, 1892 |
| 1,459,650 | Burnett | June 19, 1923 |
| 2,973,658 | Bishop | Mar. 7, 1961 |
| 3,003,165 | Charlat | Oct. 10, 1961 |